April 13, 1937.  M. E. SAMUEL  2,077,014
CULINARY DEVICE
Filed Dec. 10, 1935
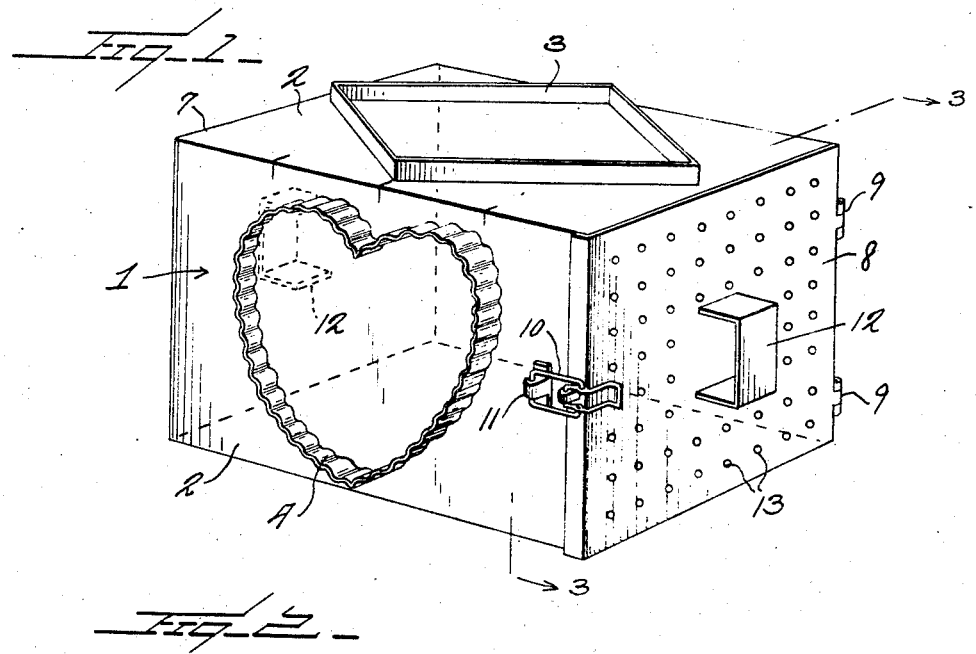
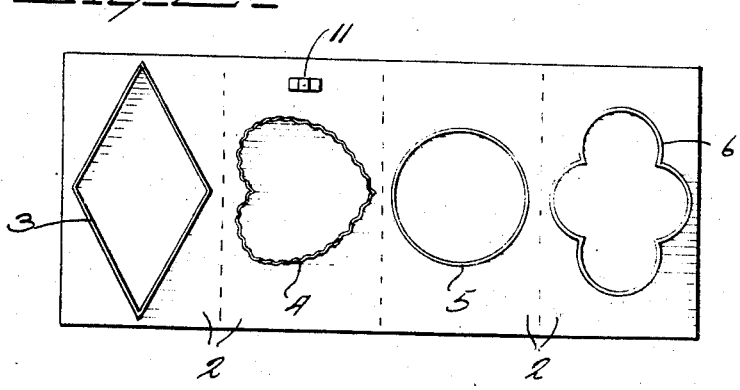
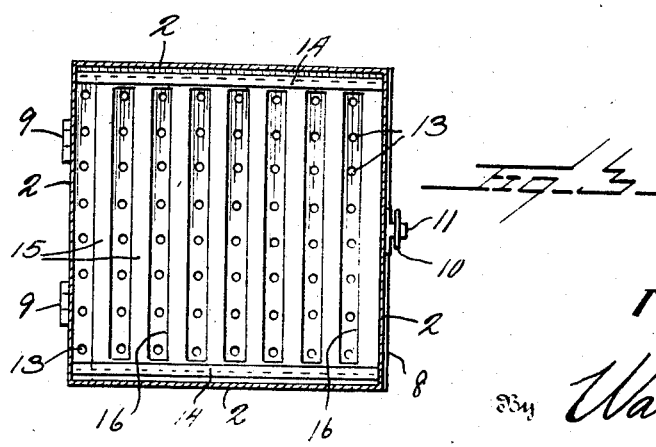
Inventor
M. E. Samuel
By Watson E. Coleman
Attorney Patented Apr. 13, 1937

2,077,014

UNITED STATES PATENT OFFICE 2,077,014

CULINARY DEVICE

Mary Evelynne Samuel, Martins Ferry, Ohio

Application December 10, 1935, Serial No. 53,798

1 Claim. (Cl. 209—236)

This invention relates to the class of culinary devices and pertains particularly to an improved dough cutter and shaker for powdered substances.

The primary object of the present invention is to provide a novel combination shaker receptacle for sugar, flour, or like powdered substances, and a cutter for cutting or forming biscuits or cakes in various forms.

Another object of the invention is to provide a novel cutter and shaker in which improved means is employed for controlling the flow of material through the apertures of the shaker top.

A further object is to provide a culinary device of the character above described wherein the body of the shaker is provided with graduations to adapt the same for use as a measuring receptacle and wherein a cutter forming a part of the device is so formed as to adapt it to use as a pie crimper.

The present invention contemplates the provision of a rectangular receptacle having a hinged wall constituting a cover which is provided with perforations through which powdered material may be shaken. This wall and the opposite wall are provided with a handle whereby any one of the other walls of the receptacle may be conveniently disposed over a body of dough to effect the cutting of the same by a cutter element carried by the wall.

The perforated wall is provided upon its underside with guides which support a shut-off slide made up of a series of bars, each of which is adapted to overlie, when the slide is in one position, a row of the lid apertures so as to prevent the contents of the receptacle from escaping.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:

Figure 1 is a view in perspective of the device embodying the present invention.

Fig. 2 is a view illustrating a blank of the side walls of the receptacle showing the character of the cutter upon each.

Fig. 3 is a sectional view on the line 3—3 of Fig. 1.

Referring now more particularly to the drawing, the device embodying the present invention comprises a rectangular receptacle which is indicated generally by the numeral 1, in which each of the side walls 2, when the receptacle is to be made of a size to form a standard cup measure, is approximately four and one-quarter inches long and two and one-half inches wide and is provided with a dough or biscuit cutting knife which is formed to describe a figure such as the diamond 3, heart 4, circle 5, or compound figure 6. The ends of the receptacle are indicated by the numerals 7 and 8, and the end wall 7 is fixed while the end wall 8 is pivotally or hingedly attached, as indicated at 9, to an edge of a side wall and is provided with a latching unit 10 adapted to engage a tongue 11 to maintain the hinged wall in closed position. Each of the walls 7 and 8 is provided with a centrally located handle 12 whereby the receptacle may be conveniently rotated so as to bring any one of the cutter units into the desired downwardly directed position necessary for cutting through a rolled-out layer of dough.

The hinged wall or cover 8 of the receptacle is provided with a plurality of apertures 13 from which powdered material such as sugar, flour, or the like may be sifted. Upon the inner side the cover has adjacent each of two opposite edges a guide 14, and between these guides is supported a plate 15 which is slidable in a plane parallel with the cover 8, as will be apparent from Fig. 3. This plate 15 in the form here illustrated, has a plurality of parallel transverse slots 16 formed therein so that when it is in one position the apertures 13 will be uncovered by the portions of the plate lying between the slots, thus permitting the contents of the receptacle to be shaken out, and when the plate is shifted to the opposite position the portions between the slots will cover the apertures so that the contents of the receptacle cannot escape. While there has been illustrated a plate having parallel slots therein, these may be in the form of apertures which when the plate is in one position will aline with the apertures of the cover.

The heart-shaped cutter 4 is also crimped, as illustrated, so that it may be used as a means of crimping the edge of a pie, and in addition one corner of the receptacle is provided with equidistantly spaced marks designating a quarter, a half, or three-quarters of the receptacle and facilitating the use of the same in measuring quantities of liquids or solids. These designations may represent one single cup of material or if the receptacle is of a size to hold only a single cup, then the markings will represent a quarter, half, or three-quarters of a cup, and a full receptacle will represent one-half pound of solids or one-half pint of liquids. Any change in the size of the receptacle from the size described will be proportionate to this size, so that the graduations thereon will be in relation. For example, if the receptacle is doubled in size so that its capacity is two cups or sixteen fluid ounces the graduations will then represent one-half cup, one cup, or three-fourths of a cup, etc.

From the foregoing it will be readily apparent that the herein-described cutter is of a character which may be conveniently handled for the purpose of cutting various forms from a body of dough, and because of the provision of the sprinkler top therefor the cut bodies may be sprinkled at once with flour without the necessity of handling more than one implement. In addition, the provision of the graduation marks upon the receptacle adapts the same to ready use as a means for measuring various dry or liquid substances and the crimped cutter 4 facilitates the provision of a crimped edge to a pie or similar pastry.

What is claimed, is:

A culinary device, comprising a receptacle, a top hingedly attached to the body of the receptacle and closing one side, said top having a plurality of apertures therein, a pair of guides disposed in spaced parallel relation on and secured to the top adjacent opposite sides thereof and in spaced relation therewith, and a frame member having side portions slidably engaged between said guides and the top and having a plurality of transverse flat bars lying against the underside of the top, said frame being of a size to have limited sliding movement beneath the top on said guides whereby said bars may be arranged to cover and close or uncover said apertures.

MARY EVELYNNE SAMUEL.